United States Patent [19]

Wada

[11] Patent Number: 4,867,665

[45] Date of Patent: Sep. 19, 1989

[54] PLASTIC MATERIAL MOLDING APPARATUS

[75] Inventor: Masayoshi Wada, Chiba, Japan

[73] Assignee: Nakatani Kikai Kabushiki Kaisha, Tokyo, Japan

[21] Appl. No.: 243,484

[22] Filed: Sep. 9, 1988

[30] Foreign Application Priority Data

Jul. 7, 1988 [JP] Japan ................................ 63-167759
Jul. 7, 1988 [JP] Japan ................................ 63-167761

[51] Int. Cl.$^4$ ............................................. B29C 47/92
[52] U.S. Cl. .................................... 425/145; 425/146; 425/147; 425/205; 425/557; 425/560; 425/563
[58] Field of Search ............... 425/145, 146, 147, 544, 425/557, 560, 563, 205

[56] References Cited

U.S. PATENT DOCUMENTS

| | | | |
|---|---|---|---|
| 2,359,840 | 10/1944 | Goessling | 425/146 |
| 2,881,477 | 4/1959 | Triulzi | 425/145 |
| 3,611,503 | 10/1971 | Blumer | 425/586 |

Primary Examiner—Jay H. Woo
Assistant Examiner—Timothy W. Heitbrink
Attorney, Agent, or Firm—James E. Nilles; Donald C. McGaughey

[57] ABSTRACT

A plastic material molding apparatus, wherein when the pressure at a material inlet of a cylinder of a material holding mechanism increases as a piston in the cylinder compresses a resilient member provided in the material holding mechanism, the speed of a motor for driving a material fluidizing mechanism is reduced. A servo motor for intermittently driving a plastic material metering and delivering mechanism is controlled according to the revolution speed and a predetermined total number of revolutions of the servo motor and to the number of pulses from a pulse generator provided in the servo motor. A relief valve is interposed between a material delivery port and a delivery nozzle of the metering and delivering mechanism, the relief valve being adapted to open when the material pressure at the delivery port is higher than the relief pressure, the relief pressure being set higher than the vapor pressure according to the temperature of the material at the delivery port. When the amount of material delivered to the material holding mechanism reaches a specified volume, the fluidizing mechanism is made to continue its operation and the material contained in the material holding mechanism is discharged into the metering and delivering mechanism together with the material being delivered from the fluidizing mechanism.

7 Claims, 3 Drawing Sheets

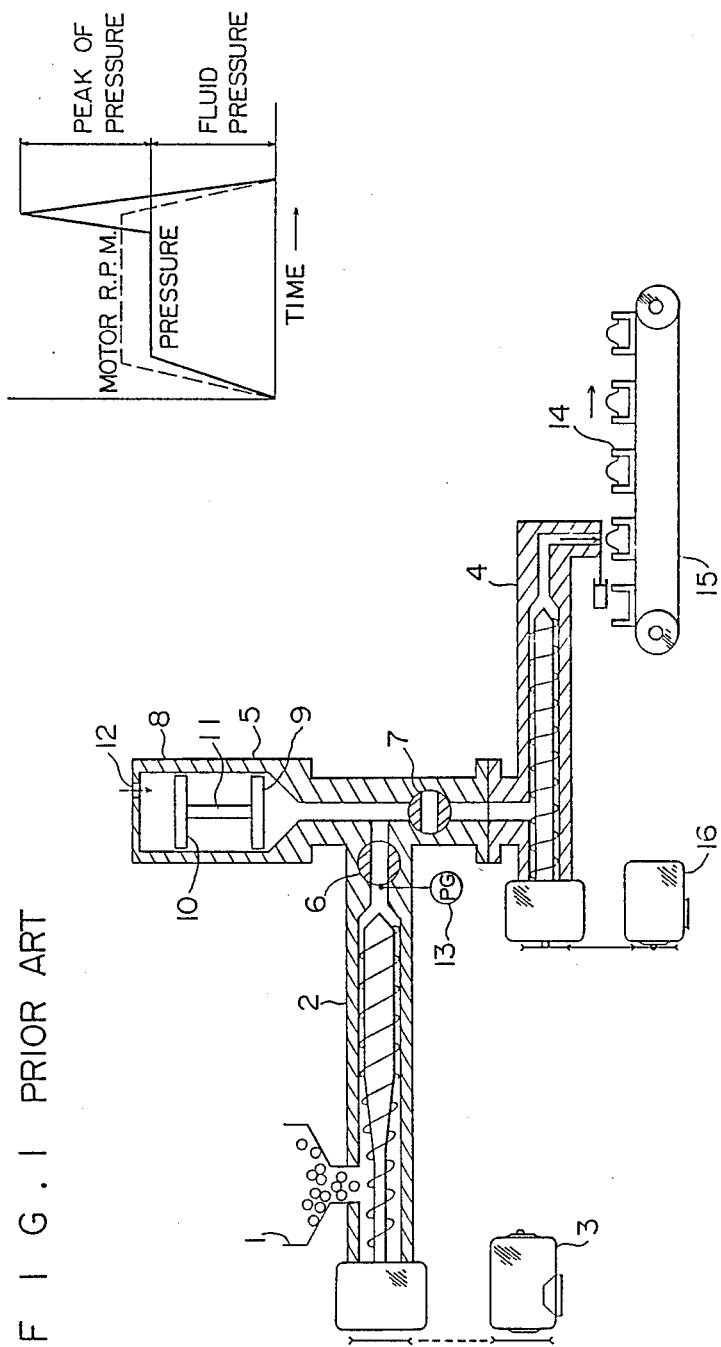

PLASTIC MATERIAL MOLDING APPARATUS

BACKGROUND OF THE INVENTION

1. Field of the Invention

This invention relates to a plastic material molding apparatus and more particularly to a plastic material molding apparatus which has a material holding mechanism and a material metering and delivering mechanism.

2. Description of the Prior Art

FIG. 1 shows a conventional plastic material molding apparatus with a plastic material holding mechanism and a metering and delivering mechanism. In the figure, reference numeral 1 represents a hopper for supplying plastic material; 2 a plastic material fluidizing mechanism; 3 a drive motor; 4 a metering and delivering mechanism; 5 a material holding mechanism installed, through valves 6, 7, between the fluidizing mechanism 2 and the metering and delivering mechanism 4; 8 a cylinder for the material holding mechanism 5; 9 and 10 cylinder pistons on the material side and on the pressure chamber side respectively; 11 a piston rod connecting these pistons; 12 a pressure fluid supply port in the cylinder 8 that opens to the pressure chamber of the cylinder; 13 a pressure detector for detecting the pressure at the material inlet of the cylinder 8; 14 molds for successively accepting the kneaded material intermittently discharged out of the metering and delivering mechanism 4; 15 a conveyor; and 16 a motor for the delivering mechanism 4.

In the above plastic material molding apparatus, the plastic material is heated and fluidized by the fluidizing mechanism 2 and introduced through the valve 6 into the material holding mechanism 5. The valve 7 is opened as needed and pressurized air is supplied into the pressure chamber in the cylinder 8 to push the material in the cylinder 8 into the metering and delivering mechanism 4. The motor 16 is then driven to discharge the metered material intermittently onto the molds 14 on the conveyor 15.

In such plastic material molding apparatuses, the material is introduced into the material holding mechanism 5. When the cylinder 8 of the material holding mechanism 5 is filled with the material and the pressure at the material inlet of the cylinder 8 becomes higher than the pressure in the pressure chamber of the cylinder 8, the increased pressure is detected by the pressure detector 13 to stop the motor 3 for the fluidizing mechanism 2.

However, when the motor 3 is stopped, the fluidizing mechanism 2 does not immediately stop due to the inertia of the motor 3 and the fluidizing mechanism 2, so that the material continues to be forced into the cylinder 8 even after the piston 10 on the pressure chamber side of the material holding mechanism 5 has contacted the rear wall of the cylinder 8. Thus, as shown in FIG. 2, the pressure at the material inlet of the cylinder 8 suddenly increases, leading to a possible failure of the cylinder and associated components.

The amount of plastic material intermittently discharged from the metering and delivering mechanism 4 is determined by the product of the revolution speed of the motor 16 and the duration of motor rotation. The time during which the motor is operated is generally set by a timer.

The timer, however, has variations in its operation time and also is affected by ambient temperatures. In addition, the motor speed greatly varies depending on the magnitude of load and supply voltage variations.

The operation time variations of the timer generally fall in the range of ±0.3 to ±2% of the maximum setting time. In practice, the timer is often used at about one third of the maximum setting time. In that case the operation time variation is three times as large as the above variation range, i.e., ±0.9 to ±6%.

The effect of the ambient temperature on the timer operation time is about ±2% of the maximum setting time.

Therefore, when for example a 120-second timer is set at 60 seconds, the operation time variation will be ±120×0.02=2.4 seconds; and the effect of temperature will be ±120×0.02=2.4 seconds.

Thus the total variation will be as large as ±4.8/60=±8%

In the metering and delivering mechanism that intermittently discharges such plastic materials as hot melted polymer, variations in the weight of each shot cannot be prevented, even if the rotation of the delivery pump is controlled accurately.

The primary cause of the variations is that the water contained in the melted material is vaporized to form bubbles and thereby increases the volume of the material, so that even when the delivery pump is correctly controlled to discharge the material as accurately as possible, the material thus discharged will be lighter by as much as there are bubbles.

To solve this problem, it is most effective to suppress the formation of water vapor and this can be achieved by keeping the melted polymer pressure higher than the vapor pressure.

FIG. 3 shows the operation sequence of the material holding mechanism in a conventional plastic material molding apparatus. When the pressure detector 13 detects a pressure higher than that in the pressure chamber of the cylinder 8, the fluidizing mechanism 2 is stopped, say, 60 seconds after starting, at which time 2 liters of material for example is contained in the cylinder 8.

Then, the valve 7 is opened and a pressure fluid is supplied into the pressure chamber of the cylinder 8 to discharge about 2 liters of material contained in the cylinder 8 out into the external mechanism such as the metering and delivering mechanism 4 during the period of say 30 seconds.

Such a conventional plastic material molding apparatus has the drawback that the fluidizing mechanism 2 is operated intermittently and the operation time is as long as 90 seconds.

SUMMARY OF THE INVENTION

An object of the invention is to provide a plastic material molding apparatus that can overcome the above-mentioned drawbacks. The plastic material molding apparatus of the invention comprises: a material fluidizing mechanism including a cylinder having a piston reciprocally mounted therein and a material inlet to allow said cylinder to receive material under pressure from said fluidizing mechanism; a material holding mechanism; a mechanism for detecting the pressure at the material inlet of the cylinder of the material holding mechanism; a rotary speed changing mechanism including a motor having a speed which is variable in response to said pressure at said material inlet, connected to drive the fluidizing mechanism; and a resilient member provided in the material holding mechanism, the resilient member being adapted to be compressed by movement of the piston in the cylinder; whereby when the pressure at the material inlet of the cylinder increases as the piston compresses the resilient member, the speed of the motor for driving the material fluidizing mechanism is reduced.

The plastic material molding apparatus of the present invention further comprises a plastic material metering and delivering mechanism connected to the material holding mechanism; a servo motor having a variable revolution speed for intermittently driving the metering and delivering mechanism; a pulse generator provided in the servo motor for generating a given number of pulses for each servo motor revolution; a mechanism for setting the servo motor to operate at a desired revolution speed; a digital mechanism for setting the total number of revolutions said servo motor should make; and a control mechanism for operations the servo motor at the revolution speed set and for the total number of revolutions of the servo motor in response to the number of pulses produce by the pulse generator.

The plastic material molding apparatus of the present invention further comprises a relief valve interposed between the material delivery port and the delivery nozzle of the metering and delivering mechanism, the relief valve having a relief pressure and operable to open when the material pressure at the delivery port is higher than the relief pressure, the relief pressure being set higher than the vapor pressure of the material at the delivery port.

The plastic material molding apparatus of this invention further comprises a mechanism for detecting the pressure at the material inlet of the cylinder of the material holding mechanism whereby when said pressure at the material inlet of the cylinder reaches a specified value the fluidizing mechanism is made to continue its operation and the material contained in the material holding mechanism is discharged into the plastic material metering and delivering mechanism together with the material being delivered from the fluidizing mechanism.

According to the plastic material molding apparatus of this invention, failure of or damage to the material holding mechanism and other related mechanism due to the inertia of the motor and the fluidizing mechanism can be prevented. Another advantage is that variations in the operation time of the metering and delivering mechanism can be reduced significantly. Moreover, formation of bubbles due to vaporization in the material can be prevented, making the accurate metering and delivering of the material possible. The operation time can also be

BRIEF DESCRIPTION OF THE DRAWINGS

FIG. 1 is an explanatory drawing of a conventional plastic material molding apparatus;

FIG. 2 is a diagram showing the pressure at the material inlet of the cylinder in the apparatus of FIG. 1;

DESCRIPTION OF THE PREFERRED EMBODIMENTS

Now embodiments of the invention will be described by referring to the attached drawings.

Figure 4:
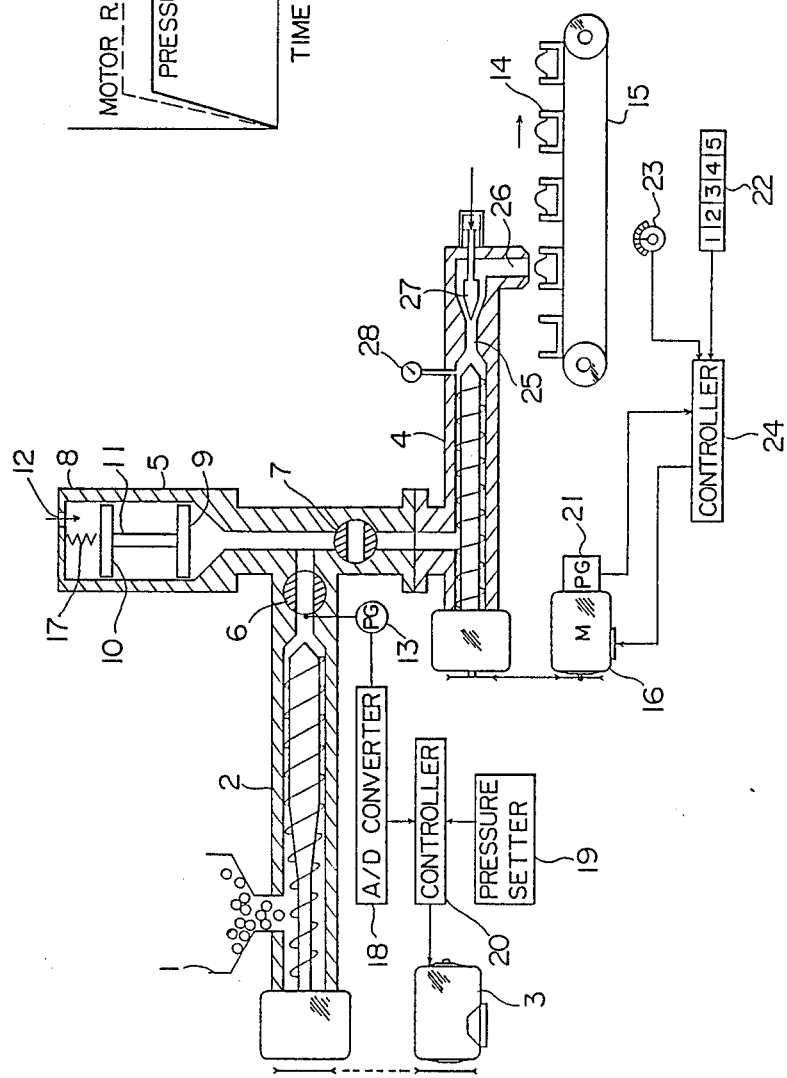
FIG. 4 is an explanatory drawing of a plastic material molding apparatus according to the invention.

In the plastic material molding apparatus of this invention as shown in FIG. 4, a compression spring 17 of a specified length is installed in the pressure chamber of the cylinder 8 of the material holding mechanism 5 to project inwardly from the rear wall of the cylinder 8. A variable speed motor is used as a motor 3. The analog signal from the pressure detector 13 is converted by an A/D converter 18 into a digital signal which is compared with a digital signal from a pressure setter 19. According to the result of the pressure comparison, a controller 20 reduces the speed of the motor 3 in response to the pressure increase at the material inlet of the cylinder 8.

In this invention, as the motor 16 a servo motor is used which has a pulse generator 21 that generates 1000 to 4000 pulses for each revolution. A digital switch 22 is used instead of the timer to digitally specify the operation time of the motor 16 with the number of motor revolutions in that period. The revolution speed of the motor is specified by a dial 23. Signals from the digital switch 22 and dial 23 are processed together with the signals from the pulse generator 21 by a controller 24 to digitally control the servo motor.

Furthermore, a relief valve 27 is interposed between a delivery port 25 and a delivery nozzle 26 of the pressure of the relief valve 27, the valve 27 is opened to discharge the material from the delivery nozzle 26. The relief pressure of the relief valve 27 is set higher than the vapor pressure according to the temperature of the molten material at the delivery port 25.

Figure 6:
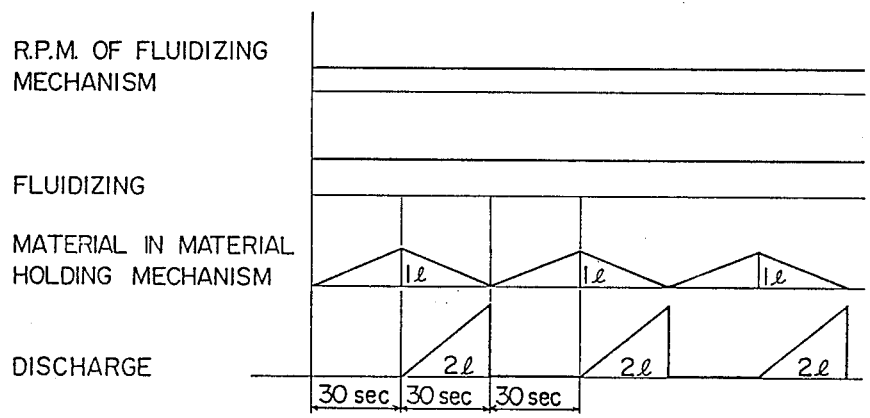
FIG. 6 is a diagram showing the operation sequence of the material supplying device in the plastic material molding apparatus of this invention.

In the plastic material molding apparatus of FIG. 4, the cylinder 8 of the material holding mechanism 5 has the capacity about one-half of the conventional cylinder capacity, i.e. one liter. When the cylinder is filled with the material and this is detected by the pressure detector 13, the valve 7 is moved from the closed position shown in FIG. 4 to an open position, while the valve 6 is left open and the fluidizing mechanism 2 still operating. At the same time the pressure fluid is applied to the pressure chamber of the cylinder 8 to discharge about one liter of material from the cylinder 8 by the action of the pistons 9, 10 out into the external mechanism together with the material delivered from the fluidizing mechanism 2. When the material in the cylinder 8 is completely discharged and the total amount of material discharged from the cylinder 8 and from the fluidizing mechanism 2 reaches a specified volume, say, 2 liters, the motor 16 for the material metering and delivering mechanism is started to start the next cycle of operation. This operation sequence is shown in FIG. 6. A flow meter may be used instead of the pressure detector 13.

Figure 3:
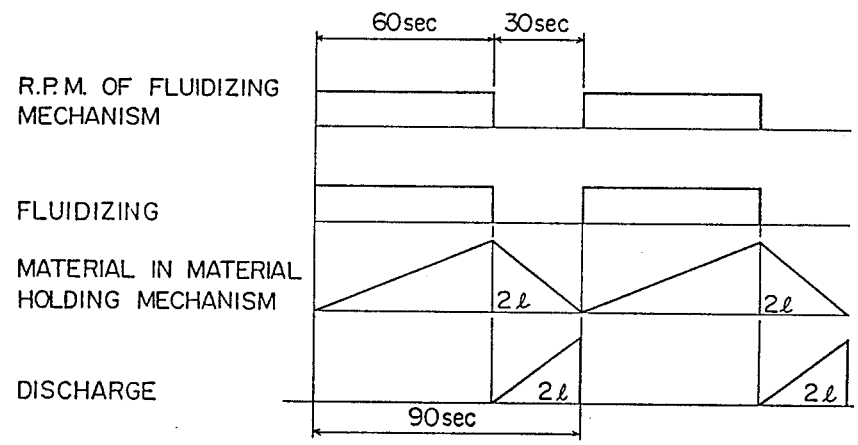
FIG. 3 is a diagram showing the operation sequence of the material supplying device in the conventional plastic material molding apparatus.

In such construction, the operation time for discharging the material can be reduced by one-half. If the cylinder 8 of 2 liters as the conventional cylinder is used, and the material is discharged during the period of 30 seconds as shown in FIG. 3, about 3 liters of material can be discharged in the same operation time.

Figure 5:
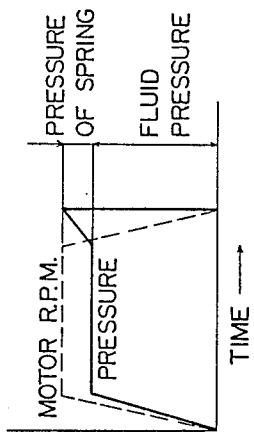
FIG. 5 is a diagram showing the pressure at the material inlet of the cylinder in the apparatus of FIG. 4.

Because of the above construction, the pressure at the material inlet of the cylinder 8 is almost constant and equal to the fluid pressure in the pressure chamber of the cylinder 8 during the period from the inception of material introduction into the cylinder 8 until the piston 10 on the pressure chamber side contacts the free end of the compression spring 17, as shown in FIG. 5. As the piston 10 compresses the spring 17, the spring pressure increases, so that the pressure at the material inlet of the cylinder 8 progressively increases. However, with the apparatus of this invention, the speed of the motor 3 gradually decreases with the pressure increase at the material inlet. Therefore, if the motor 3 is set so that it will stop when the pressure at the material inlet is close to a pressure at which the spring 17 is compressed to the maximum extent, the material inlet of the cylinder 8 can be free from a sudden pressure jump as would occur in the conventional apparatus, even when there is an inertia of the motor.

In this invention the metering and delivering mechanism 4 is controlled by the servo motor and the digital switch. Let us consider a case where the motor 16 is to be rotated for 60 seconds at the rate of 1000 revolutions per minute. If the number of pulses for one revolution is assumed to be 4000, the total number of pulses that the pulse generator 21 must produce is given by $$1000 \times 60/60 \times 4000 = 4 \times 10^6$$

The revolution error of the motor 16 can be suppressed to one pulse. In other words the motor revolution variation is given by $$\pm 1/(4 \times 10^6) = \pm 0.000025\%$$

Further, since the relief valve 27 is installed at the delivery port 25 of the metering and delivering mechanism 4 and the relief pressure is set higher than the vapor pressure according to the molten temperature of the material at the delivery port 25, the discharge pressure of the material is always higher than the vapor pressure, preventing the formation of bubbles in the material due to vaporization, making the amount of material discharged highly accurate.

Another advantage of the invention is that the fluidizing mechanism 2 need not be stopped, permitting 100% utilization of its capacity, reducing the operation time of the equipment. Moreover, the cylinder 8 needs to have only one-half of the conventional cylinder volume.

What is claimed is:

1. A plastic material molding apparatus comprising: a material fluidizing mechanism; a material holding mechanism including a cylinder having a piston reciprocally mounted therein and a material inlet to allow said cylinder to receive material under pressure from said fluidizing mechanism; a mechanism for detecting the pressure at said material inlet of said cylinder of the material holding mechanism; a rotary speed changing mechanism including a motor having a speed which is variable in response to said pressure at said material inlet, connected to drive said fluidizing mechanism; and a resilient member provided in the material holding mechanism, said resilient member being adapted to be compressed by movement of said piston in the cylinder; whereby when said pressure at the material inlet of the cylinder increases as the piston compresses the resilient member, said speed of the motor for driving the material fluidizing mechanism is reduced.

2. A plastic material molding apparatus comprising: a material fluidizing mechanism; a material holding mechanism connected to receive material from said material fluidizing mechanism; a plastic material metering and delivering mechanism connected to said material holding mechanism; a servo motor having a variable revolution speed for intermittently driving the metering and delivering mechanism; a pulse generator provided in the servo motor for generating a given number of pulses for each servo motor revolution; a mechanism for setting the servo motor to operate at a desired revolution speed; a digital mechanism for setting a total number of revolutions said servo motor should make; and a control mechanism for operating said servo motor at the revolution speed set and for the total number of revolutions of the servo motor in response to the number of pulses produced by said pulse generator.

3. A plastic material molding apparatus for processing plastic material having a variable vapor pressure which corresponds to the temperature of the material when in a molten state comprising: a material fluidizing mechanism; a material holding mechanism including a cylinder having a piston reciprocally mounted therein and a material inlet for receiving material under pressure from said material fluidizing mechanism; a plastic material metering and delivering mechanism connected to receive material from said material holding mechanism and having a material delivery port and a delivery nozzle; and a relief valve interposed between said material delivery port and said delivery nozzle of the metering and delivering mechanism, said relief valve having a relief pressure and operable to open when the material pressure at the delivery port is higher than said relief pressure, said relief pressure being set higher than said vapor pressure of the material at the delivery port.

4. A plastic material molding apparatus comprising: a material fluidizing mechanism; a material holding mechanism including a cylinder having a piston reciprocally mounted therein and a material inlet for receiving material under pressure from said material fluidizing mechanism; a mechanism for detecting the pressure at said material inlet of said cylinder of the material holding mechanism; a resilient member provided in the material holding mechanism, said resilient member being adapted to be compressed by said piston in the cylinder; a plastic material metering and delivering mechanism connected to receive material from said material holding mechanism; a driving mechanism for said fluidizing mechanism; and a controller for said driving mechanism; whereby when said pressure at said material inlet of the cylinder reaches a specified value, the fluidizing mechanism is made to continue its operation and the material contained in the material holding mechanism is discharged into the plastic material metering and delivering mechanism together with the material being delivered from the fluidizing mechanism.

5. A plastic material molding apparatus for processing plastic material having a variable vapor pressure which corresponds to the temperature of the material when in a molten state comprising: a material fluidizing mechanism; a material holding mechanism including a cylinder having a piston reciprocally mounted therein and a material inlet for receiving material under pressure from said material fluidizing mechanism; a mechanism for detecting the pressure at said material inlet of said cylinder of the material holding mechanism; a rotary speed changing mechanism including a motor, having a speed changing mechanism including a motor, having a speed which is variable in response to said pressure at said material inlet, connected to drive said fluidizing mechanism; a resilient member provided in the material holding mechanism, said resilient member being adapted to be compressed by said piston in the cylinder; a plastic material metering and delivering mechanism connected to receive material from said material holding mechanism and having a material delivery port and a delivery nozzle; a servo motor having a variable revolution speed for intermittently driving the metering and delivering mechanism; a pulse generator provided in the servo motor for generating a given number of pulses for each servo motor revolution; a mechanism for setting said servo motor to operate at a desired revolution speed; a digital mechanism for setting a total number of servo motor revolutions; a control mechanism for operating said servo motor at the revolution speed set and for the total number of revolutions of the servo motor in response to the number of pulses produced by said pulse generator; and a relief valve interposed between said delivery port and said delivery nozzle of the metering and delivering mechanism, said relief valve having a relief pressure and operable to open when the material pressure at the delivery port is higher than said relief pressure, said relief pressure being set higher than said vapor pressure of the material at the delivery port; whereby when the pressure at said material inlet of the cylinder increases as the piston compresses the resilient member, said speed of the motor for driving the material fluidizing mechanism is reduced.

6. The plastic material molding apparatus according to claim 1 or 5, wherein cylinder has a pressure chamber and a rear wall and wherein said resilient member is a compression spring of a specified length installed in the pressure chamber of the cylinder so as to project inwardly from the rear wall of the cylinder.

7. A plastic material molding apparatus for processing plastic material having a variable vapor pressure which corresponds to the temperature of the material when in a molten state comprising: a material fluidizing mechanism; a material holding mechanism including a cylinder having a piston reciprocally mounted therein and a material inlet for receiving material under pressure from said material fluidizing mechanism; a plastic material metering and delivering mechanism connected to receive material from said material holding mechanism and having a material delivery port and a delivery nozzle; a servo motor for intermittently driving the metering and delivering mechanism; a pulse generator provided in the servo motor for generating a given number of pulses for each servo motor revolution; a digital mechanism for setting a total number of servo motor revolutions; a control mechanism for stopping said servo motor for the total number of revolutions of the servo motor in response to the number of revolutions of the servo motor in response to the number of pulses produced by said pulse generator; and a relief valve interposed between the said delivery nozzle of the metering and delivering mechanism, said relief valve having a relief pressure and operable to open automatically when the material pressure at the delivery port becomes a higher than said relief pressure due to the operation of said servo motor and said plastic material metering and delivering mechanism and operable to close automatically when the material pressure at the delivery port becomes lower than said relief pressure, said relief pressure being set higher than said vapor pressure of the material at the delivery port.

* * * * *